US008564410B2

(12) United States Patent
Greene

(10) Patent No.: US 8,564,410 B2
(45) Date of Patent: Oct. 22, 2013

(54) SHIPPING CONTAINER SECURITY PROCESS

(76) Inventor: Paul Llewellyn Greene, Leesburg, VA (US)

( * ) Notice: Subject to any disclaimer, the term of this patent is extended or adjusted under 35 U.S.C. 154(b) by 378 days.

(21) Appl. No.: 13/112,674

(22) Filed: May 20, 2011

(65) Prior Publication Data

US 2011/0285509 A1 Nov. 24, 2011

Related U.S. Application Data

(60) Provisional application No. 61/346,543, filed on May 20, 2010.

(51) Int. Cl.
*H04Q 5/22* (2006.01)

(52) U.S. Cl.
USPC ..... 340/10.1; 340/10.2; 340/10.3; 340/10.31; 340/10.32; 340/10.33; 340/10.34; 340/10.4; 340/10.41; 340/10.42; 340/10.5; 340/10.51; 340/10.52; 340/10.6; 340/539.22; 340/539.23; 340/539.26; 340/539.31; 340/541; 340/551; 340/568.1; 340/568.2; 340/572.1; 340/572.2; 340/572.3; 340/572.4; 340/572.5; 340/572.6; 340/572.7; 340/572.8; 340/572.9; 705/22; 705/28; 235/375; 235/376; 235/377; 235/378; 235/379; 235/280; 235/281; 235/282; 235/283; 235/284; 235/385

(58) Field of Classification Search
USPC ........ 340/10.1–10.6, 539.22, 539.23, 539.26, 340/539.31, 541, 551, 568.1, 568.2, 340/572.1–572.9; 235/375–385; 705/22, 28
See application file for complete search history.

(56) References Cited

U.S. PATENT DOCUMENTS

| | | | |
|---|---|---|---|
| 4,654,658 A | 3/1987 | Walton | |
| 5,831,531 A | 11/1998 | Tuttle | |
| 6,069,563 A | 5/2000 | Kadner et al. | |
| 6,148,291 A * | 11/2000 | Radican | 705/28 |
| 6,265,973 B1 | 7/2001 | Brammall et al. | |
| 6,662,642 B2 | 12/2003 | Breed et al. | |
| 6,747,558 B1 | 6/2004 | Thorne et al. | |
| 6,925,471 B2 * | 8/2005 | Bodin et al. | 235/462.31 |
| 7,036,729 B2 * | 5/2006 | Chung | 235/385 |
| 7,239,238 B2 | 7/2007 | Tester et al. | |
| 7,342,497 B2 | 3/2008 | Chung et al. | |
| 7,348,886 B2 | 3/2008 | Himberger et al. | |
| 7,364,089 B2 | 4/2008 | Claessens et al. | |
| 7,385,510 B2 | 6/2008 | Childress et al. | |
| 7,406,439 B2 * | 7/2008 | Bodin et al. | 705/22 |
| 7,414,571 B2 * | 8/2008 | Schantz et al. | 342/125 |
| 7,570,164 B2 * | 8/2009 | Chakraborty et al. | 340/572.1 |
| 7,602,296 B2 * | 10/2009 | Ulibarri | 340/572.1 |
| 8,184,006 B2 * | 5/2012 | Greene | 340/572.1 |
| 8,207,854 B2 * | 6/2012 | Greene | 340/572.1 |
| 8,279,048 B2 * | 10/2012 | Gravelle et al. | 340/10.42 |

(Continued)

FOREIGN PATENT DOCUMENTS

WO WO 2010091412 A1 * 8/2010

*Primary Examiner* — George Bugg
*Assistant Examiner* — Paul Obiniyi
(74) *Attorney, Agent, or Firm* — Da Vinci's Notebook, LLC

(57) ABSTRACT

A process for monitoring containers including use of a severable security lock with an radio frequency identification (RFID) antenna adapted sever upon dislocation of the lock. The process utilizes an electronic identification number to ensure security lock integrity. The process includes detecting the security lock in transit by the use of mobile and fixed transmission units at regional boundaries. Updates are provided to an event log associated with the security lock.

18 Claims, 14 Drawing Sheets

(56) References Cited

U.S. PATENT DOCUMENTS

| | | |
|---|---|---|
| 2002/0038267 A1* | 3/2002 | Can et al. ................... 705/28 |
| 2002/0130778 A1* | 9/2002 | Nicholson ............... 340/572.1 |
| 2003/0038172 A1* | 2/2003 | Bodin et al. ............... 235/100 |
| 2003/0144926 A1* | 7/2003 | Bodin et al. ................. 705/28 |
| 2004/0041705 A1* | 3/2004 | Auerbach et al. ....... 340/539.22 |
| 2004/0113782 A1 | 6/2004 | Auerbach et al. |
| 2005/0075987 A1* | 4/2005 | Pintsov et al. ............. 705/401 |
| 2005/0237154 A1* | 10/2005 | Kafry et al. .............. 340/10.1 |
| 2005/0242950 A1 | 11/2005 | Lindsay et al. |
| 2006/0192709 A1* | 8/2006 | Schantz et al. ............ 342/125 |
| 2006/0202824 A1* | 9/2006 | Carroll et al. ............ 340/568.1 |
| 2006/0247986 A1* | 11/2006 | Joao ........................... 705/28 |
| 2007/0273484 A1* | 11/2007 | Cederlof et al. ......... 340/10.33 |
| 2008/0018489 A1* | 1/2008 | Kruest et al. ............ 340/825.2 |
| 2008/0042830 A1* | 2/2008 | Chakraborty et al. ........ 340/540 |
| 2008/0121690 A1* | 5/2008 | Carani et al. ................ 235/376 |
| 2008/0122656 A1* | 5/2008 | Carani et al. ............ 340/995.28 |
| 2008/0122691 A1* | 5/2008 | Carani et al. ............ 342/357.07 |
| 2008/0125964 A1* | 5/2008 | Carani et al. ................ 701/207 |
| 2008/0125965 A1* | 5/2008 | Carani et al. ................ 701/207 |
| 2008/0174485 A1* | 7/2008 | Carani et al. ............ 342/357.07 |
| 2008/0191937 A1* | 8/2008 | Wisherd et al. .......... 342/357.03 |
| 2008/0215461 A1* | 9/2008 | Bodin et al. .................... 705/28 |
| 2008/0266131 A1* | 10/2008 | Richardson et al. ..... 340/825.49 |
| 2010/0013635 A1* | 1/2010 | Berger et al. ................ 340/542 |
| 2010/0079238 A1* | 4/2010 | Gravelle et al. ............... 340/5.8 |
| 2010/0201486 A1* | 8/2010 | Greene ....................... 340/10.1 |
| 2010/0238032 A1* | 9/2010 | Greene ..................... 340/572.1 |
| 2010/0250460 A1* | 9/2010 | Twitchell, Jr. ............... 705/332 |
| 2011/0285509 A1* | 11/2011 | Greene ....................... 340/10.1 |

* cited by examiner

SHIPPING CONTAINER SECURITY PROCESS

CROSS-REFERENCE TO RELATED APPLICATIONS

The present application claims the benefit of U.S. provisional application Ser. No. 61/346,543 titled Shipping Container Security Process, filed May 20, 2010 and is incorporated herein by reference in its entirety.

FIELD OF THE INVENTION

The present invention relates to the field of security and more specifically to the field of radio frequency container integrity.

BACKGROUND

The most prevalent use for intermodal containers is for the shipment of goods throughout the world. These goods are boxed and/or palletized and placed in the container. The container doors are closed, and locked via a latch. Usually a seal made of plastic or metal is affixed to show that the container is sealed. The container is then placed on a chassis, and leaves the yard to be transported to the final destination.

Upon arrival at another intermodal facility, the container often passes through a portal containing a line scan camera to collect the container number. Upon arriving at a check-in kiosk, a second camera attempts to zoom in to the seal on the container door. The numbers are then checked and verified against a waybill as a means to determine if the contents of the container are intact. In the instance where the numbers do not match, the truck driver is queried as to whether or not s/he is aware of any tampering with the container. In the absence of facts to the contrary, the assumption is that a person mistakenly in entered the waybill number.

According to the United States Department of Transportation, theft of the contents of intermodal containers costs companies between $2,000,000,000 and $10,000,000,000 per year. This wide array of figures is due to reluctance on the part of the transportation industry to fully disclose the true and full costs. The primary reasons cited include fear of higher insurance rates, potential fodder for competitors, and the belief that theft is just the cost of doing business.

The current process of check-in and check-out of an intermodal container may entail a remote visual inspection of the container seal via camera. On many occasions the truck driver must exit the truck, move to the rear of the container, and manually manipulate the seal so that the camera operator can read the serial number on the seal. At times, the driver is required to read the seal number out loud to the camera operator. The average check-in/check-out time is approximately two minutes.

Information relevant to attempts to address these problems can be found in U.S. Pat. Nos. 5,831,531; 6,069,563; 6,265,973; 6,747,558; 7,036,729; 7,239,238; 7,342,497; 7,348,886; 7,364,089; and 7,385,510; and U.S. Published Patent Applications No. 2004/0041705; 2004/0113782; and 2006/0202824. However, each one of these references suffers from one or more disadvantages. There is a need for a security process capable of simplified remote monitoring of containers, both stationary and in transit; inexpensive monitoring of containers; and cross-checking the integrity of container data.

SUMMARY

The present invention is directed to a remotely monitorable shipping container security process. The process includes identifying responsibility regions belonging to at least two conveyance parties. The responsibility regions include nested, substantially constrained pre-defined traffic pathways and have distinct geographic boundaries. A lock is provided with a unique identifier.

The preferred lock of the present invention includes a reception block that supports a chipset with a primary integrated circuit and a primary antenna. An elongate mast extends from the reception block and includes a differential width that increases with distance from the reception block. A primary closed loop antenna includes a separable portion that extends upon the mast. Separation of the mast severs the primary antenna and prevents further transmissions to or from the lock through the severed antenna. Versions of the lock may further include a secondary closed loop antenna that communicates with the chipset. It is preferred that versions of the lock with a secondary antenna also include a chipset with a secondary integrated circuit.

The lock is provided with a unique identifier, preferably an electronic alphanumeric sequence that distinguishes the lock from other locks. The identifier may be electronically written to the primary integrated circuit, the secondary integrated circuit, or both to establish an electronic identification number (ESN). The elongate mast of the lock, in an open position, is placed within a barrier latch of a container and the container is sealed by placing the mast into a closed position. An event log is accessed at a time proximate to the time of placing the lock in a closed position. The event log maintains information pertinent to the existence of the lock, including a time stamp indicating the closing time of the lock.

The lock is detected at various points of its travel through local security signals from transmission units positioned near the responsibility region boundaries and the traffic pathways. The detection includes receipt of transmissions from the primary integrated circuit through the primary antenna. The data of the security signals is transmitted by the transmission unit to a distant compilation party. The event log is again contacted when the lock is removed from the closed position. The lock may be replaced at any stage of conveyance; upon replacement, the even log is accessed to notify the compilation party of the change.

Therefore, it is an aspect of the present invention to provide a process capable of simplified remote monitoring of containers, both stationary and in transit.

It is a further aspect of the present invention to provide a process capable of inexpensive monitoring of containers.

It is a further aspect of the present invention to provide a process capable of cross-checking the integrity of container data.

It is a further aspect of the present invention to provide a process capable of transmissions/reception of container data along substantial distances.

It is a further aspect of the present invention to provide a process capable of data entry/reading upon/from one or more electronic media.

It is a further aspect of the present invention to provide a process capable of destruction of signal transfer capability of at least one data transfer medium upon tampering.

It is a further aspect of the present invention to provide a process capable of use without a dedicated power source.

It is a further aspect of the present invention to provide a process capable of use with a minimal power source.

It is a further aspect of the present invention to provide a process capable of quick affixation and removal.

It is a further aspect of the present invention to provide a process capable of use with data protection schemes, both inherent and interactively escalating.

These aspects of the invention are not meant to be exclusive. Furthermore, some features may apply to certain versions of the invention, but not others. Other features, aspects, and advantages of the present invention will be readily apparent to those of ordinary skill in the art when read in conjunction with the following description, and accompanying drawings.

DETAILED DESCRIPTION

Figure 1:
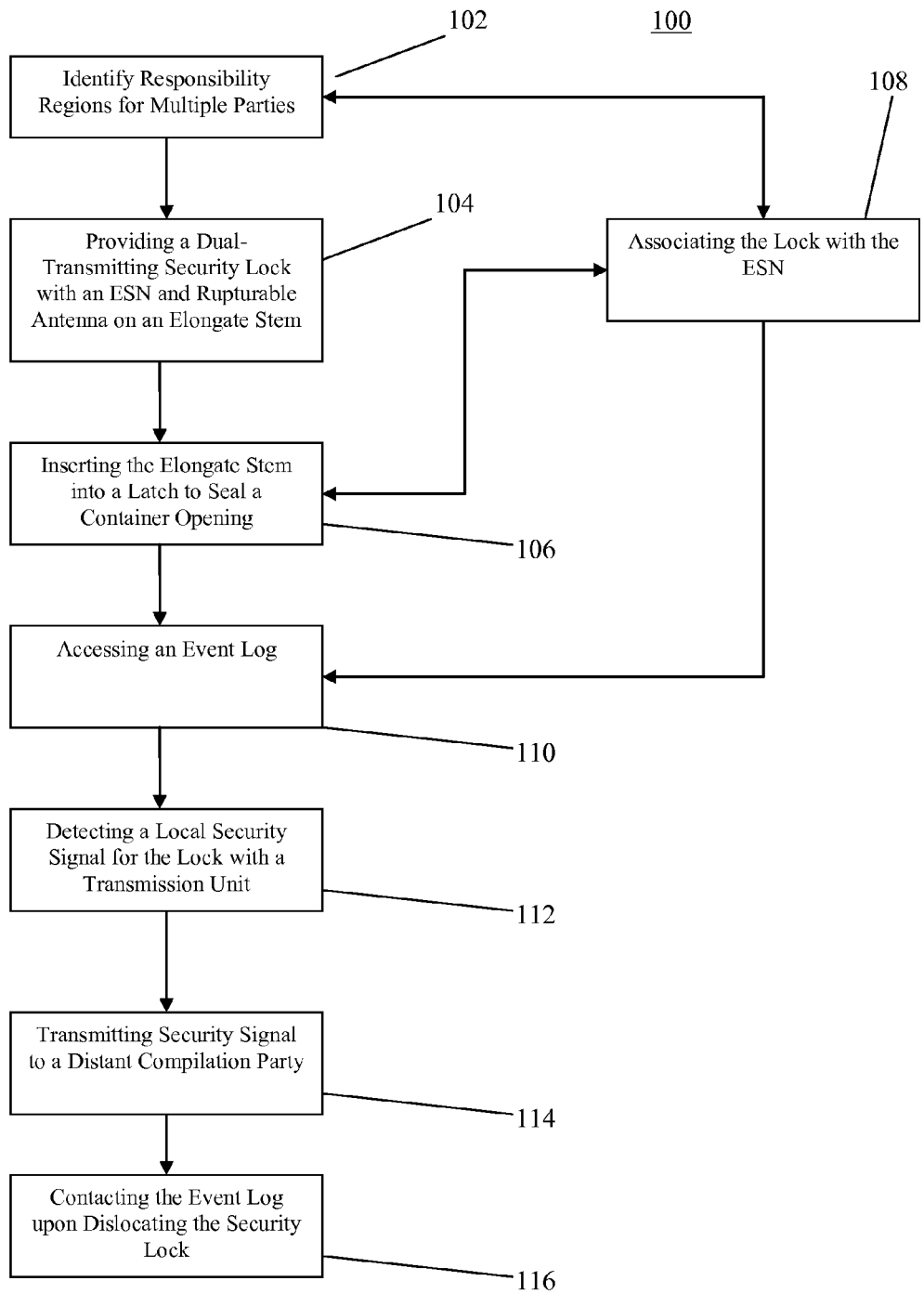
FIG. 1 is a view of the process of the present invention.
Figure 2:
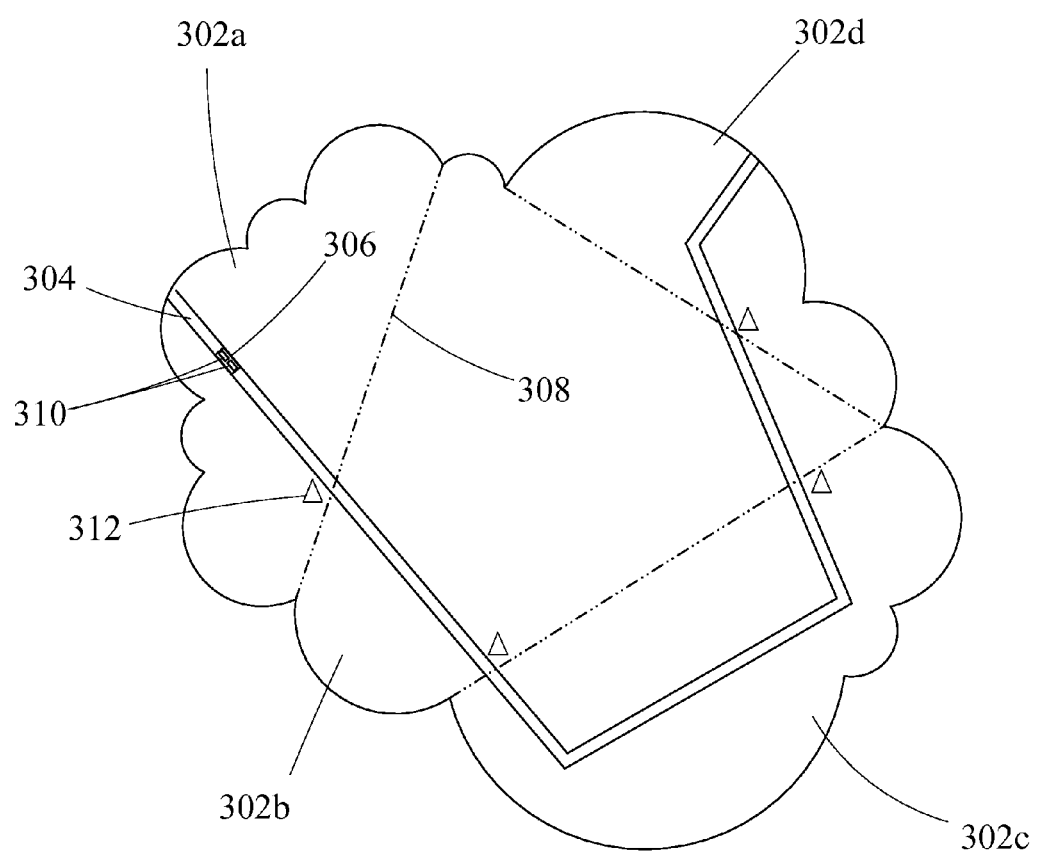
FIG. 2 is a view of a responsibility region map representation.

Referring first to FIGS. 1 and 2, a basic embodiment of the remotely monitorable shipping container security process 100 is shown. The process 100 includes identifying 102 responsibility regions 302, shown as 302a-d, for multiple security parties. The security parties of the present invention include individuals, companies, organizations, agencies, and other entities concerned with the transport of a container through commerce. The security parties may include conveyance parties, which include parties directly related to the transport of the container, e.g. shippers, receivers, inland ports, seaports, freight yards, and the like. A conveyance party is a party that accepts physical control of a container for the purpose of storage or transport and desires secured transport of the container ancillary to its primary transport and possession role. The security parties may include regulatory parties, which include parties primarily related to the legal review of the container activity in commerce, e.g. NSA, USCIS, CBP and the like, and possession or transport of a container is incidental to regulatory party's security function. The security parties may include compilation parties that are authorized by a security party to acquire and retain data related to container transport along multiple segments of the container transport, and parties primarily related to the financial and positional review of container activity in commerce, e.g. insurance companies, monitoring companies, and the like. The conveyance party may be a compilation party. A preferred compilation party is a reach-through compilation party, which includes a trusted third party that possesses permission from at least two conveyance parties to track either directly or indirectly a container bearing a lock of the present invention as it proceeds through commerce.

The container 310 includes any vessel suited to accept products for transport within. Examples of shipping containers 310 for use with the present invention include intermodal containers, rolling stock, transport trailers, storage containers, boxes, and the like. The shipping container of the present invention includes an actuating portion that discloses the interior of the container in one position and prevents substantial access to the interior of the container in a second position. The actuating portion may include a top cover, door, movable sidewall, and the like. The container includes a latch positionally proximate to the actuating portion of the shipping container and includes an aperture to receive a security device, e.g. a padlock. The latch of the present invention includes any device that selectively obstructs the actuating portion of the container when fitted with a lock.

The container 310 is accepted by a vehicle 306 for commercial transport. The vehicle 306 of the present invention is any active or passive transport device capable of accepting and moving a container 310 for region-to-region transport. Examples of vehicles include freight trucks and rolling stock, particularly well cars and single-stack COFC spine cars used in the transportation of domestic and international ISO containers. The regional transport of containers is common, and frequently involves multiple parties with areas of control and responsibility. The parties' operations can be defined and ascertained according to geographical boundaries. In FIG. 2, by way of example, the transport of containers 310 on vehicle 306 occurs along a pathway 304 that winds through regions, 302a, then 302b, then 302c, then 302b, and finally region 302d. The pathway 304 of the present invention is the actual path of the container transport through the responsibility regions 302 and may include such transportation means as roads, railroad tracks, canals, rivers, conveyor belts, and the like. The pathways 304 are substantially confined in that the motion of the container during conveyance is restricted by the dimensions of the pathway in a number of areas suitable to ensure that container passage must pass through preselected, pre-defined points. In pathways such as railroad tracks and roads, the restrictions include the confines of the tracks and rails. The present invention does not require entirely confined pathways; for example, a water pathway plied by a barge may be confined only at the beginning and end of its journey by the narrow dimensions of its origin berth and destination berth. The present invention is adapted to work in concert with ocean container shipping and large, inland waterway shipments as well. The responsibility regions 302 will have pre-defined boundaries 308 where a first security party no longer accepts responsibility for the transport, care, maintenance, security of a container. Such boundaries are preferably drawn according the permitted operational territory, property rights, or other desired boundaries of the security parties.

Figure 3:
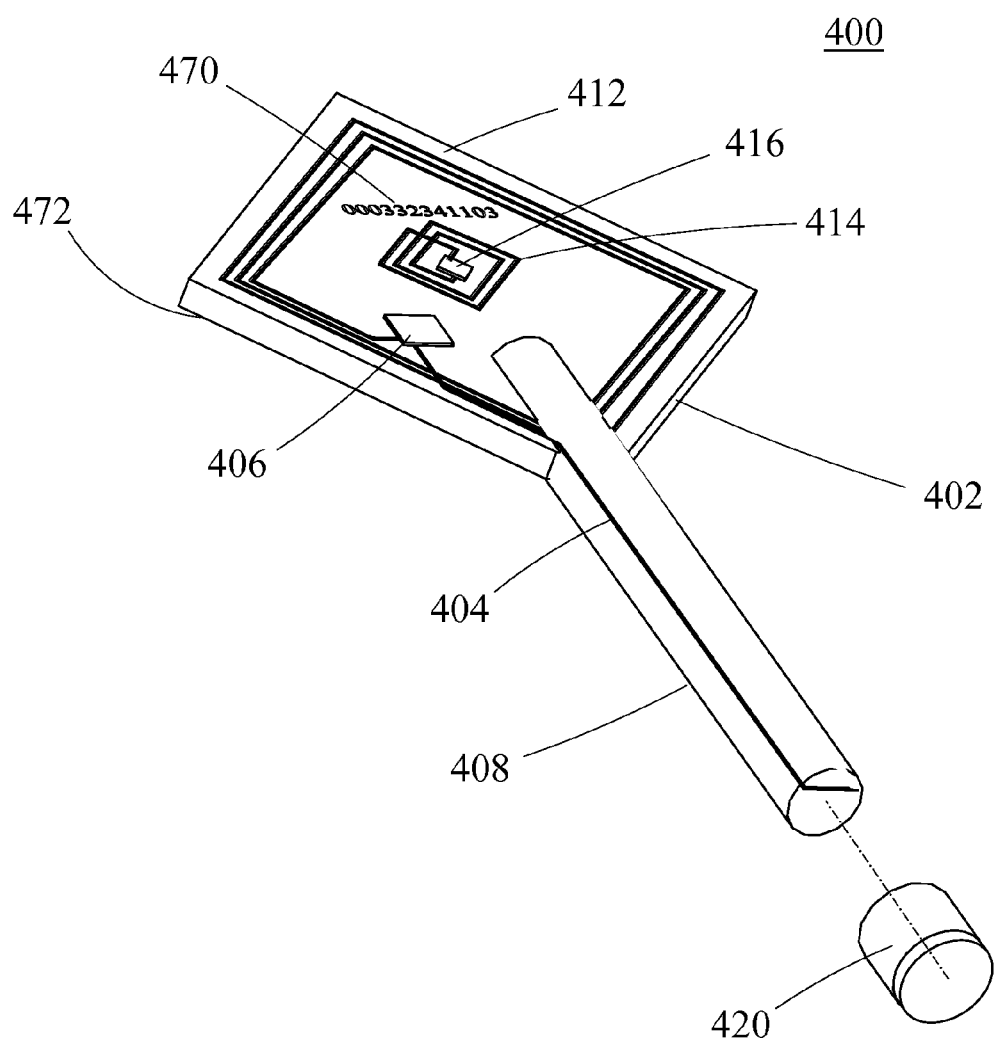
FIG. 3 is an exploded view of the device of the present invention.

A security lock of the present invention is then provided 104 for insertion 106 into a latch of a container. The security lock is positioned in the latch of the container 310. Turning now to FIG. 3, the security lock 400 includes a reception block 402 with a reception surface 412. Embodiments of the present invention may feature a substantially-planar reception surface 412. By substantially planar it is meant that the reception surface 412 is flat to a degree that allows a primary antenna 404 to be positioned on the reception surface 412 for transmission and acceptance of data signals. The data signals, i.e. signaled transmissions, of the present invention may include radio transmissions, electromagnetic transmissions, and other broadcasts capable of conveying information, power, or any combination of the two through an open medium. References within this disclosure to one variety of transmission include all other transmissions capable of use by the mentioned device or like device, particularly references to electromagnetic or radio signals. When one or more antennae are placed on the reception surface, the substantially planar reception surface 412 is appropriately sized to create a large angle of incidence to accept incoming signals; this planar nature is particularly important as the security lock 400 is adapted to be used in conjunction with large metal containers in the LF (e.g., frequencies less than 135 KHz complying with ISO/IEC 18000-2), HF (e.g., 13.56 MHz complying with ISO/IEC 18000-3, ISO/IEC15693 & ISO/IEC 14443), UHF (e.g., 433 MHz complying with ISO/IEC 18000-7 & 860 MHz to 960 MHz complying with ISO/IEC 18000-6), VHF and Microwave (e.g., 2.45 GHz complying with ISO/IEC 18000-4) bands. A preferred transmission character includes transmissions of approximately of those in the UHF spectrum (e.g., UHF used in accordance with the ISO 18000-6C standard). The present invention is not limited by the wavelength or frequency character of its signaled communications, and may utilize LF, HF, UHF, Microwave, and other transmissions across the frequency spectrum of RFID. Examples of the spectrum may include but are not limited to the entire range defined within the ISO/IEC 18000 parameters for air interface communication: part 1 through part 7. The shape of the reception block 402 can include any dimensions suitable to achieve the purposes of the present invention. A significant width is preferred for the security lock 400 such that placement of the security lock 400 within the container latch assembly hole positions the reception block 402 against a wall of the container in a manner that prevents substantial axial rotation of the security lock 400. The width of the reception block 402 includes dimensions that prevent the Security lock from slipping through a latch assembly hole. Preferred dimensions of the reception block 404 permit the security lock 400 to rest in a self-supporting fashion about an upper surface of a latch or other holed closing mechanism.

The reception block 402 may be constructed of any durable materials suitable for the use of the electronic equipment of the present invention. Wood is a preferred construction material in some embodiments; while other embodiments preferably utilize a thermoset plastic suitable to shield electronics from relatively adjacent metallic surfaces proximate to which the present invention may operate. The preferred dimensions of the reception block include a 5.1 cm to 25.4 cm height; a 5.1 cm to 25.4 cm width; and a 1.3 cm to 1.9 cm depth. The dimensions of the reception block 402 are preferably such that, when in contact with a substantially planar container sidewall, the security lock 400 will exhibit minimal turning characteristics. A backwall 472 with a substantially planar surface or bearing suitably positioned protrusions may assist the present invention in maintaining a stable orientation in times of substantial container motion. The relatively narrow depth, when viewed in conjunction with the width, allows substantially static placement close to the container sidewall. By substantially planar container sidewall, it is meant that the container sidewall presents a surface having multiple planar structural points that may include a flat sidewall, a sidewall with multiple planar outcroppings, or other surface offering two points that are generally planar and positioned proximate to a bolt hole. It is preferred that the reception block 402 prevents the security device from axial rotations greater than 180 degrees, and more preferably from rotations greater than 30 degrees.

The reception surface 412 includes preferred dimensions that allow the primary antenna 404 to be positioned about the periphery thereof. The present invention includes at least one antenna, and may include a primary antenna 404 and a secondary antenna 414 as FIG. 3 shows. Antennae are preferably embedded within the reception block 402 or protected by a signal translucent coating. The coating may include any plastic or other protective coating suitable to allow the transmission of radio signals therethrough while protecting the reception block and the components thereon and therein. The primary antenna 404 includes a thin metal strip affixed to an adhesive backing or a fine gauged wire. The primary antenna 404 connects to an RFID chipset, which may include one or more integrated circuit chips, shown here as a primary integrated circuit chip 406 and a secondary integrated circuit chip 416. The terms primary and secondary are used purely for the purpose of identification and may not necessarily be indicative of one component's utility with respect to another. The primary antenna 4104 preferably spans the periphery of the reception surface or a cross-section plane of the reception block and extends along a mast 408. In passive versions of the security lock 400, the primary antenna 404 is arranged both to collect power from incoming signals and also transmit an outbound signal powered according to induction created by an incoming signal. The structural interrelationship between the mast 408 and the primary antenna 404 creates a substantial security mechanism of the present invention.

Antennae of the present invention are configured to have a certain resonance frequency, so that the antenna receives new information through radio communication with a transmission unit (not shown) to store the information by integrated circuit chip or transmit the information from the integrated circuit chip to the transmission unit. The antenna of the present invention may be formed by any process known in the art, including chemical and ink insulating film etching. In a preferred version of the security lock 400, the primary antenna 404 spans the periphery of the reception block 402 and extends longitudinally along opposing portions of the mast 408. The primary antenna 404, upon reaching the terminus, i.e. the base, of the mast 408 meets thereon to form a conductive loop. The ability of the primary antenna 404 to form a closed loop allows a dual-role as a power-generation unit and transmission/reception unit. The mast 408 connects to the mast cap 420 in a manner that creates a one-way bond such that removal of the mast cap 420 from the mast 408 destroys the integrity of the primary antenna 404 closed loop nature. Destruction of the closed loop hinders, or eliminates, the ability of the primary antenna from transmitting and receiving data signals; and in passive versions of the security lock 400, may destroy the ability of the primary antenna of the Security lock 400 to generate power through signal reception. Attempts to cut, twist, or pry the mast cap 420 from the mast 408 indicate container tampering.

The primary antenna 404 connects to the chipset and preferably only to the primary integrated circuit chip 406. However, alternate versions of the security lock may include advantageous arrangements of multiple integrated circuit chips connected to a single antenna, or multiple antennae connected to multiple integrated circuit chips. In the security lock 400 of FIG. 3, the primary antenna 404 connects only to the primary integrated circuit chip 406, and a secondary antenna 414 connects only to a secondary integrated circuit chip 416.

Integrated circuit chips 406, 416 of the present invention are electrically connected to antennae 404, 414, so that the chip may be powered by energy produced due to an electromagnetic field induced according to well known principals of power-induction from a signal transmission to store, retrieve, and update information. RFID integrated circuit chips 406, 416 electrically connected to a terminal of the antennas 404, 414 through an anisotropic conductive film or other suitable adherent.

The primary integrated circuit chip 406 is positioned on the reception block 402, preferably on or embedded into the reception surface 412. Commercially available integrated circuit chips may be utilized with the present invention. It is preferred that each reception block 402 include the primary integrated circuit chip 406 and the secondary integrated circuit chip 416. The primary integrated circuit chip 406 is used to provide an automatic identification function for the identity of the security lock 400. The primary integrated circuit chip includes information suitable to allow identification of the security lock 400. In embodiments of the present invention, this information may include only that information necessary to return a Boolean value correlating to a response or non-response from the primary integrated circuit. Preferred embodiments of the present invention include additional information stored within the primary integrated circuit, such as an electronic security number, seal date, shipment method, shipment origin, shipment destination, shipment history, and the like. The primary integrated circuit chip 406 further provides radio frequency ("RF") data transmission/receipt, and provides data storage for additional verification information that may include specialized cryptographic information. The primary integrated circuit chip 406 includes an integrated circuit for storing and processing information, modulating and demodulating an RF signal, and other specialized functions for RF seal identification. It is preferred that the primary integrated circuit chip 406 and the primary antenna 404 be configured for RF transmission/receipt in the Ultra High Frequency (UHF) spectrum, which in combination with a peripherally positioned antenna about the preferred dimensions, allows for readings/transmissions of 10 meters and beyond. Distances permitted by transmission of the antennae of the present invention may be adjusted according to the specifications and advantages of integrated circuits and antennae existing at the time of use.

The secondary integrated circuit chip 416 is preferably positioned on the reception block 402 and on, or embedded, within the reception surface 412. The secondary antenna 414 connects to the secondary integrated circuit chip and is preferably positioned on the reception block 402 and on or embedded within the reception surface 412 completely within the inner perimeter of the primary antenna 406. Commercially available integrated circuit chips may be utilized as the secondary integrated circuit chip 416.

The secondary integrated circuit chip 416 is used to provide an automatic identification function for the identity of the security lock 400. It is further preferred that the secondary integrated circuit chip 416 include data, either written or inherent, that cross-references data of the primary integrated circuit chip 406. In some versions of the security lock 400, the secondary integrated circuit chip 4416 may include only information present on the primary integrated circuit chip 406, only information that corresponds in an identifying manner to information present on the secondary integrated circuit chip 416, and most preferably information that includes electronic security number, seal date, shipment method, shipment origin, shipment destination, shipment history, and the like. Preferred embodiments of the present invention utilize the secondary integrated circuit chip, when present, as the principal means of data storage of the device. The secondary integrated circuit chip includes an electronic security number individual to the device that identifies the device from other like devices. Embodiments of the present invention may include a physical identifier 470 that includes a physical reproduction of the electronic security number. The preferred physical identifier 470 is laser etched into the exterior of the device, preferably onto the reception surface 412. The physical identifier 470 may also include a physical reproduction of an electronic security number of the primary integrated circuit, which may be similar to the electronic security number of the secondary integrated circuit, either singly or in combination with the physical reproduction of the electronic security number of the physical reproduction of the secondary integrated circuit electronic security number. The electronic security number may be any sequence capable of reproduction into a numeric, alphabetical, alpha-numerical, or other like sequence.

The secondary integrated circuit chip 416 further provides ("RF") data transmission/receipt, and provides data storage for additional verification information that may include specialized cryptographic information. The secondary integrated circuit chip 416 includes an integrated circuit for storing and processing information, modulating and demodulating an RF signal, and other specialized functions for RF seal identification. As the primary integrated circuit chip 406 on a non-function security lock 400 will be incapable of providing information to a transmission unit, it is the function of the secondary integrated circuit chip 416 to provide identification information to the transmission unit to ascertain data related to the non-functional security lock 400. The secondary integrated circuit chip 416, as is it need not be the primary means of identifying the shipping container in transit, may include a secondary antenna capable of low frequency transmissions. It is preferred that the secondary integrated circuit chip 416 and the secondary antenna 414 be configured for RF transmission/receipt at frequencies lower than that of the primary antenna 404, which in combination with a centrally positioned antenna, allows for readings/transmissions of less than a meter.

In operation a user places the security lock shown into a container bolt hole latch. In doing so, the user first places the mast 408 into the bolt hole 420 and then fastens the mast cap 408 upon the mast 420. The mast cap 420 may include any number of mechanisms that grasp, straddle, or cling to the primary antenna 404 positioned on the terminus of the mast 408. The user may then use a mobile transmission unit having data entry inputs and a data display screen to read and write information onto the primary integrated circuit 406 or the secondary integrated circuit 416. The transmission unit may work in cooperation with the chipset and antennas of the security lock 400 to remotely power the security lock 400 such that a power source incorporated into the RFID would be unnecessary. Preferred mobile transmission units of the present invention include the MOTOROLA SYMBOL XR440 RFID Reader and MC9090-G RFID Gun Terminal and THINGMAGIC ASTRA 1000. The transmission unit may communicate with the security lock, the security party, or a second transmission unit. The transmission unit acts as a short distance reader/write in relation to the security lock and may act as a long distance information conduit to the security party.

The security lock 400 may include one or more power sources to power any portion of the security lock 400. The security lock 400 may include a power source that powers all functions of the security lock 400, no power source and rely on the signal reception for all necessary functions, or a power source that only powers one or more of the integrated circuit chips but does not power signal through one or more of the antennae. An additional application for any power source of the present invention is to power data storage and transmissions for future data transfers. The transmission unit may include encryption and decryption functions, and preferably provides long-range transmissions to a central authority for the security lock 400.

Figure 4:
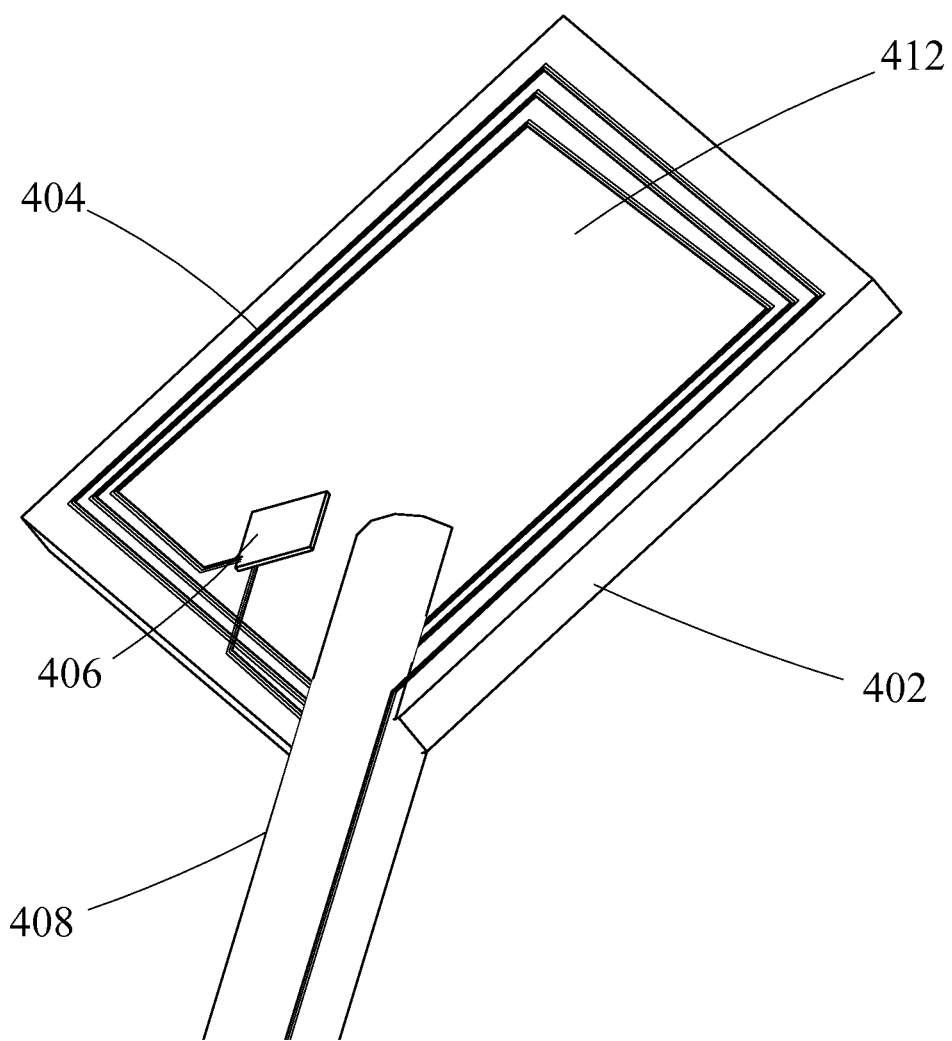
FIG. 4 is a partial, perspective view of the device of the present invention.

The security lock 400 possesses the structural ability to withstand prolonged transportation and remains inactive until read by another transmission unit or acted upon (e.g. written upon) by another transmission unit. The transmission units of the present invention may be stationary or portable. Dislocation of the mast cap 420 from the mast 408 severs the primary antenna 404, but not the secondary antenna 414. Destruction of the closed loop nature of the primary antenna 404 prevents the primary antenna 414 from being read in particular embodiments, but as the location of the secondary antenna is substantially distinct from the mast 408, it is presumably unaffected—barring tampering actions unrelated to the separation of the mast 408 from the mast cap 420. The transmission unit may read the data of the secondary integrated circuit chip to ascertain data written thereon, which may include data existing upon the primary integrated circuit but rendered unavailable due to security lock 400 tampering. Placement of the mast cap 420 onto the mast 408 creates a secure connection that may only be removed in a fashion destructive to the closed loop nature of the primary antenna 404. As FIG. 4 shows, the security lock 400 may lack physical identifiers or multiple integrated circuits and multiple antennae, relying solely on a primary integrated circuit 406 and primary antenna 404 for recognition of the security lock, event log access 110, and other steps of the process 100 of the present invention.

Returning to FIG. 1, the security lock is associated 108 with an identifier, which preferably includes the ESN. The association may occur at any stage of the life of the security lock prior to meaningful conveyance, i.e. conveyance across distances that merit protection, of the container upon which it is placed. It is preferred that the security lock is associated 108 with an identifier, both physically and electronically imprinted, prior to distribution to a conveyance party to ensure that the conveyance party cannot manipulate the identifier. Security locks may be distributed in bulk with preset ESNs, with a record of each security party's ESNs maintained by a compilation party. It is further preferred that the physical identifier bear a relation to the electronic identifier such that that each is capable of readily linking the identity of the physical identifier and electronic identifier. In most cases the physical identifier will be an exact reproduction of the electronic identifier, generally the ESN. As an alternative to the pre-existing identifier association, any security party may create and provide the identifier prior to meaningful container transit.

After the security lock is configured into the closed position, the lock is secured and substantial manipulation will destroy the integrity of the primary antenna. Proximate to the lock closing is the preferred time to access 110 event log data related to the security lock. Viewing FIGS. 5 and 6 from the top downward, with reference to FIG. 1, depicts a common exemplary process of the present invention with relevant security parties acting in concert. The conveyance party 314 possesses an inventory with multiple security locks of the present invention that are associated 108 with an ESN, include a physical representation of the ESN on the body of the lock. A customer requests transport of a container through commerce to a receiving party. The conveyance party 314 acts 102 with an understanding of pre-identified responsibility regions or establishes responsibility regions with at least one additional conveyance party. The initial conveyance party 314 utilizes a field operator, e.g. a human element with a portable transmission unit, to close the lock firmly within a container latch. Proximate in time to closing the clock within the container latch the yard operator 312 uses a portable transmission unit to access 110 an event log of the conveyance party 314, and in other embodiments an event log of a regulatory party 316 and/or a reach-through compilation party 318.

Figure 7:
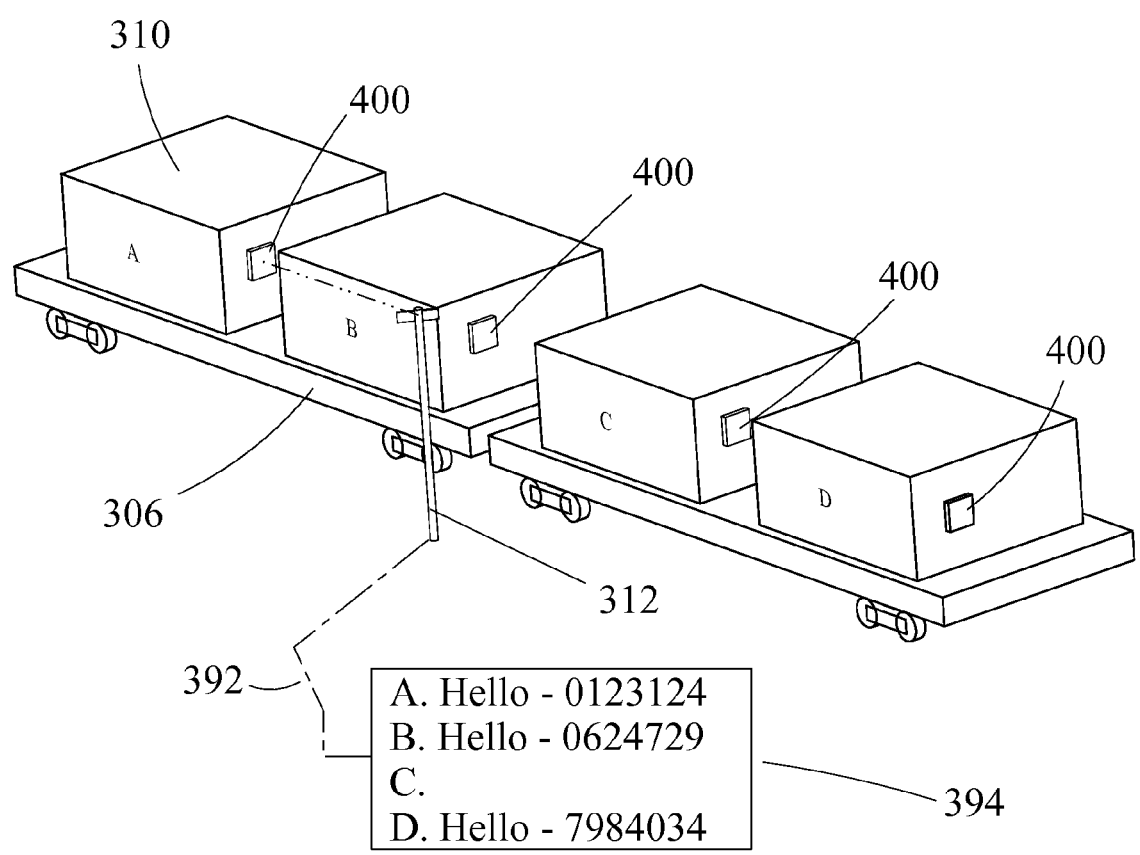
FIG. 7 is a representation of the process of the present invention.

The reach-through compilation party 318 is a compilation party that acts on behalf of multiple security parties to assure the accuracy and timely input of information relating to the conveyance of the container through commerce. The reach-through compilation party 318 has access to the transmissions, either directly or indirectly, and the data thereof to/from such parties as the conveyance party, regulatory party, or other security party. Multiple fixed transmission units 312 placed strategically at regional security boundaries, or as otherwise deemed appropriate, detect 112 a local security signal from the security locks and may transmit the data to or from the security locks. With further reference to FIG. 7, the data transmissions from the security lock include at least information pertinent to provide an identification of the lock. Information data 394 collected from security locks 400 passing the fixed transmission units 312, which may also be static, are collected and transmitted via transmission lines or signal 392 to a security party. A fixed transmission unit includes any unit that maintains a position affixed to a permanent or near permanent structure and is capable of data transmission irrespective of the physical presence of a human operator. The security party may include the initial conveyance party 314, a distinct conveyance party, a regulatory party 316, a reach-through compilation party 318, or other security party of the present invention. The container, and the security lock upon the container, may pass any number of fixed or mobile transmission units belonging to any number of conveyance parties 314.

Figure 5:
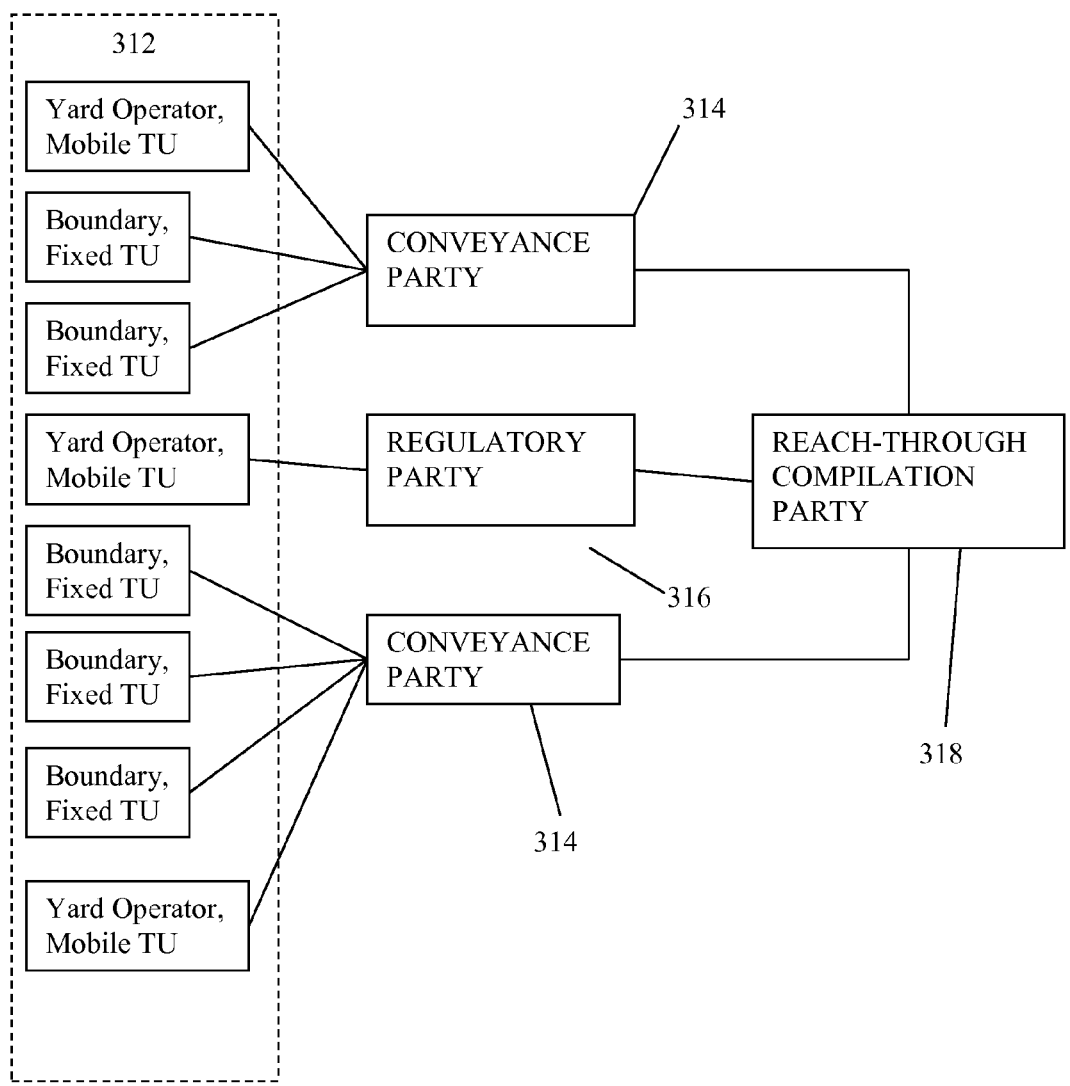
FIG. 5 is a view of the process of the present invention.
Figure 6:
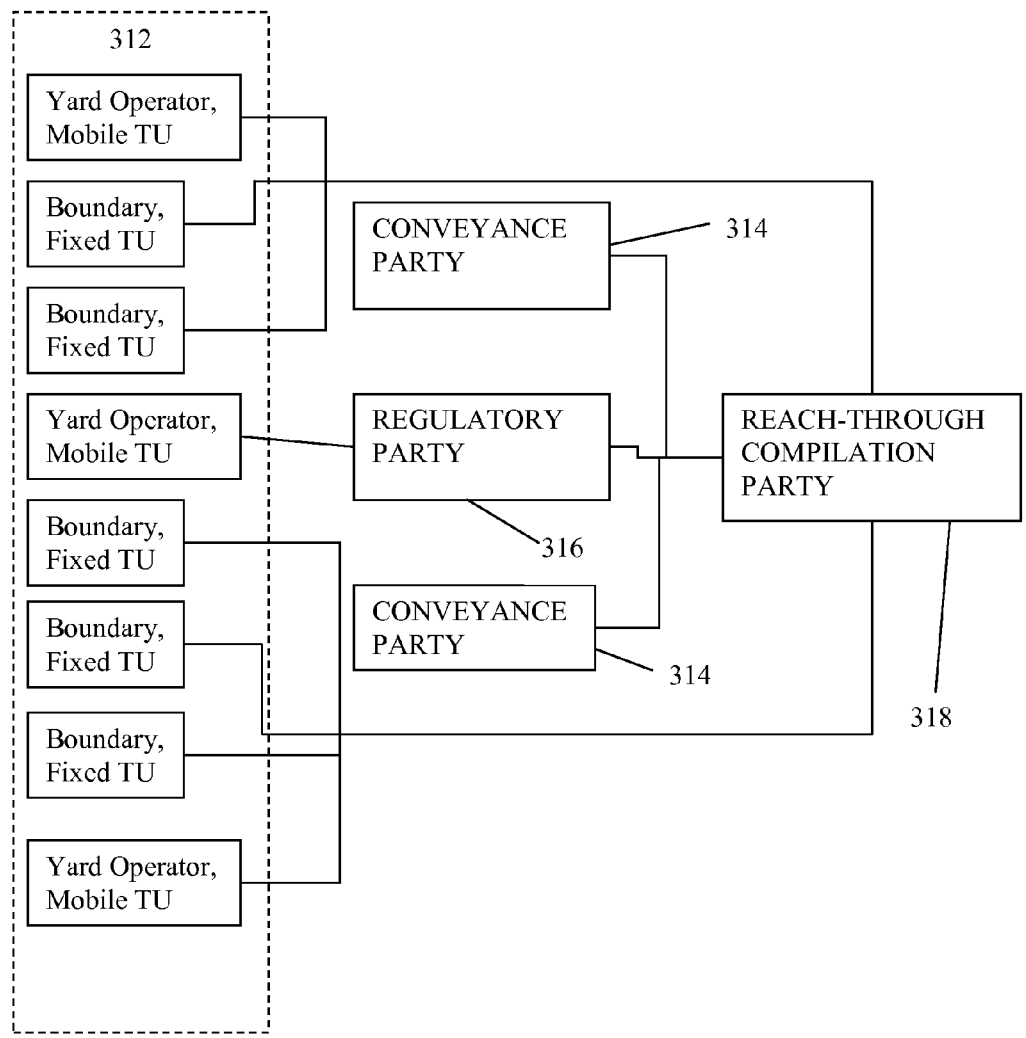
FIG. 6 is a view of the process of the present invention.
Figure 10:
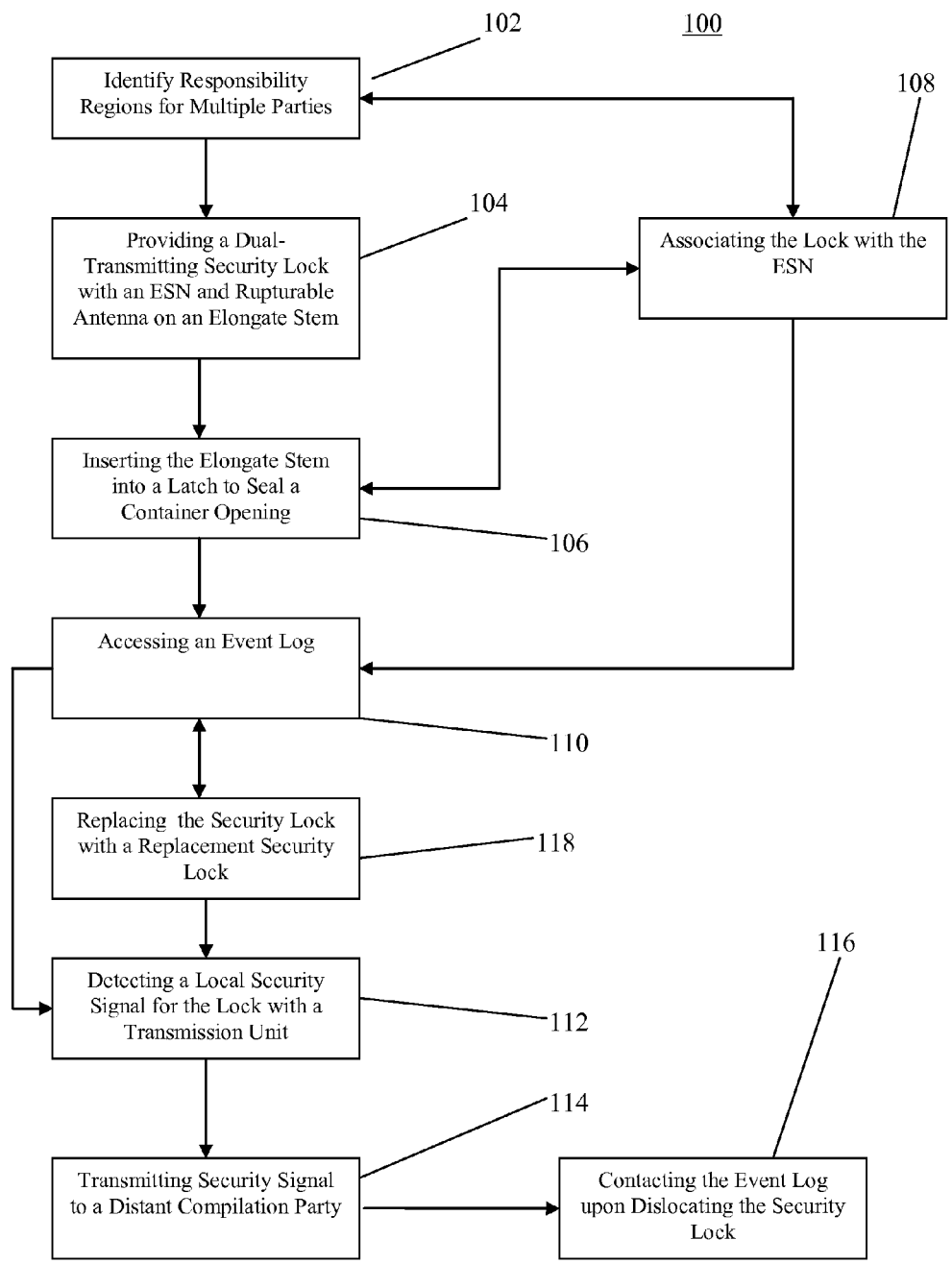
FIG. 10 is a view of the process of the present invention.
Figure 11:
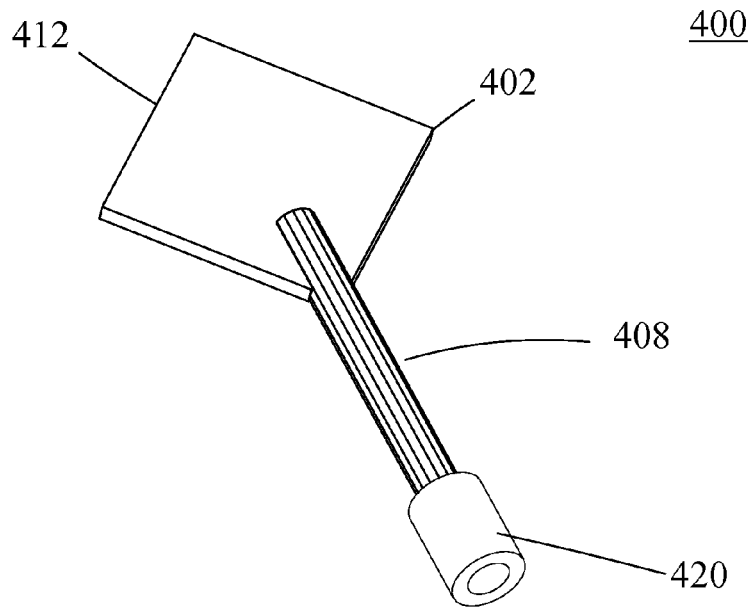
FIG. 11 is a perspective view of the device of the present invention.
Figure 12:
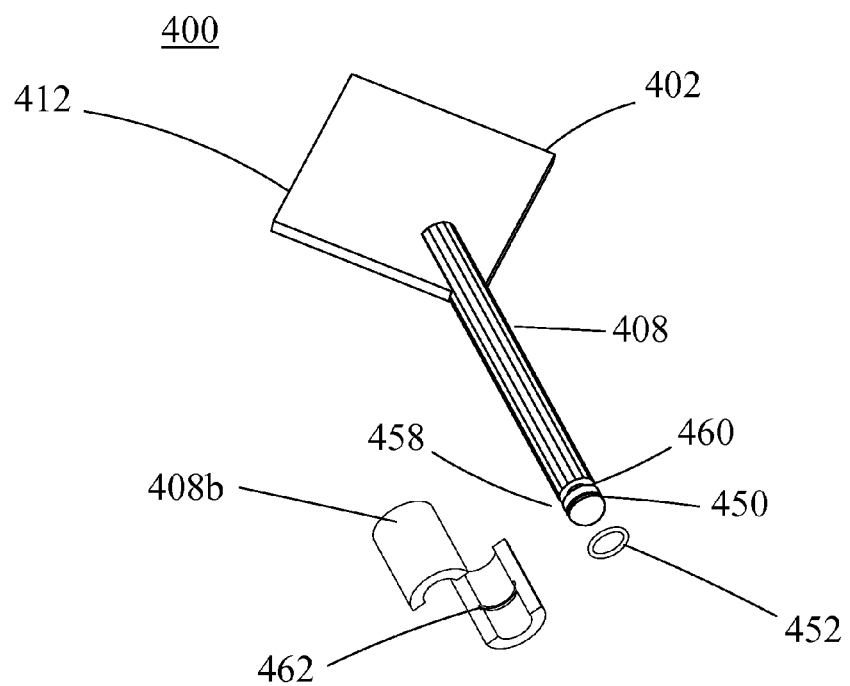
FIG. 12 is a perspective view of the device of the present invention with a cross-sectional view of an embodiment of the mast cap.
Figure 13:
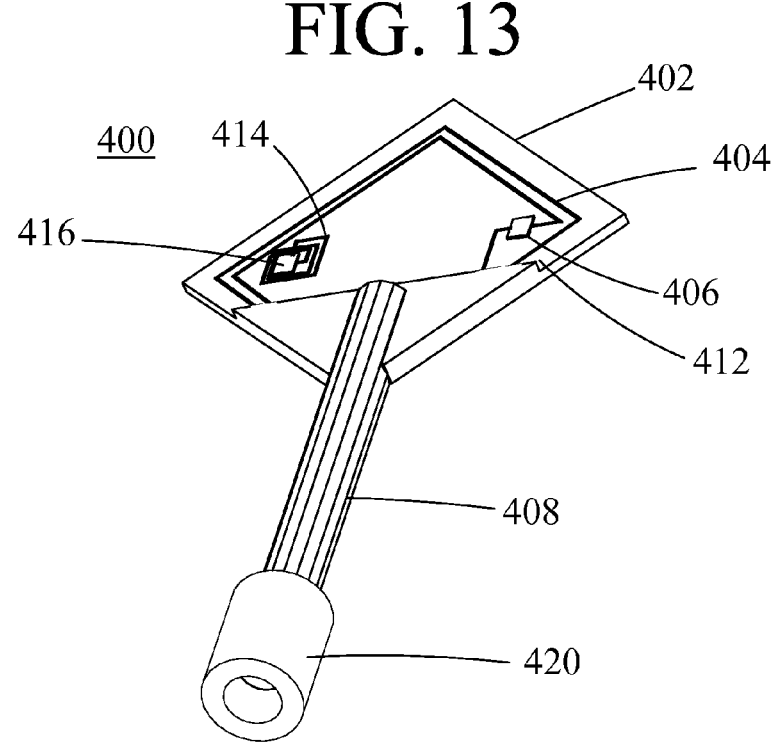
FIG. 13 is a partially exposed view of the device of the present invention.

At any time, a regulatory party 316 may seek to examine the contents of the container. Such examination may be seamlessly integrated into the process 100 of the present invention from the standpoint of data integrity, security integrity, time loss, and the like. With reference to FIGS. 5, 6 and 10, the regulatory party 316 has access to security locks associated 108 with an identifier. The regulatory party 316 may examine a container at the beginning, middle, or termination of a container's voyage through commerce. The examination may begin with the regulatory party 316 accessing 110 the event log of the conveyance party 314 directly from the conveyance party 314 or indirectly, for example, by way of the reach-through compilation party 318. Advanced versions of the security lock may allow the regulatory party 316 to access 110 the event log through the data recorded on the integrated circuit of the security lock. The regulatory party may then sever the security lock of the present invention to access to interior of the container. The regulatory party may then replace 118 the previous security lock with a second security lock of the present invention. The regulatory party may then again access 110 the event log to link the present security lock with the previous security lock By linking, it is meant that the event log includes an indication that the identifier of the initial security lock is replaced by the identifier of a subsequent security and vice versa. In such a fashion, any number of regulatory parties, or any other security party, may access the contents of a container and yet maintain container integrity electronically and instantaneously. The regulatory party 316 may then place the container again in the stream of commerce.

Figure 9:
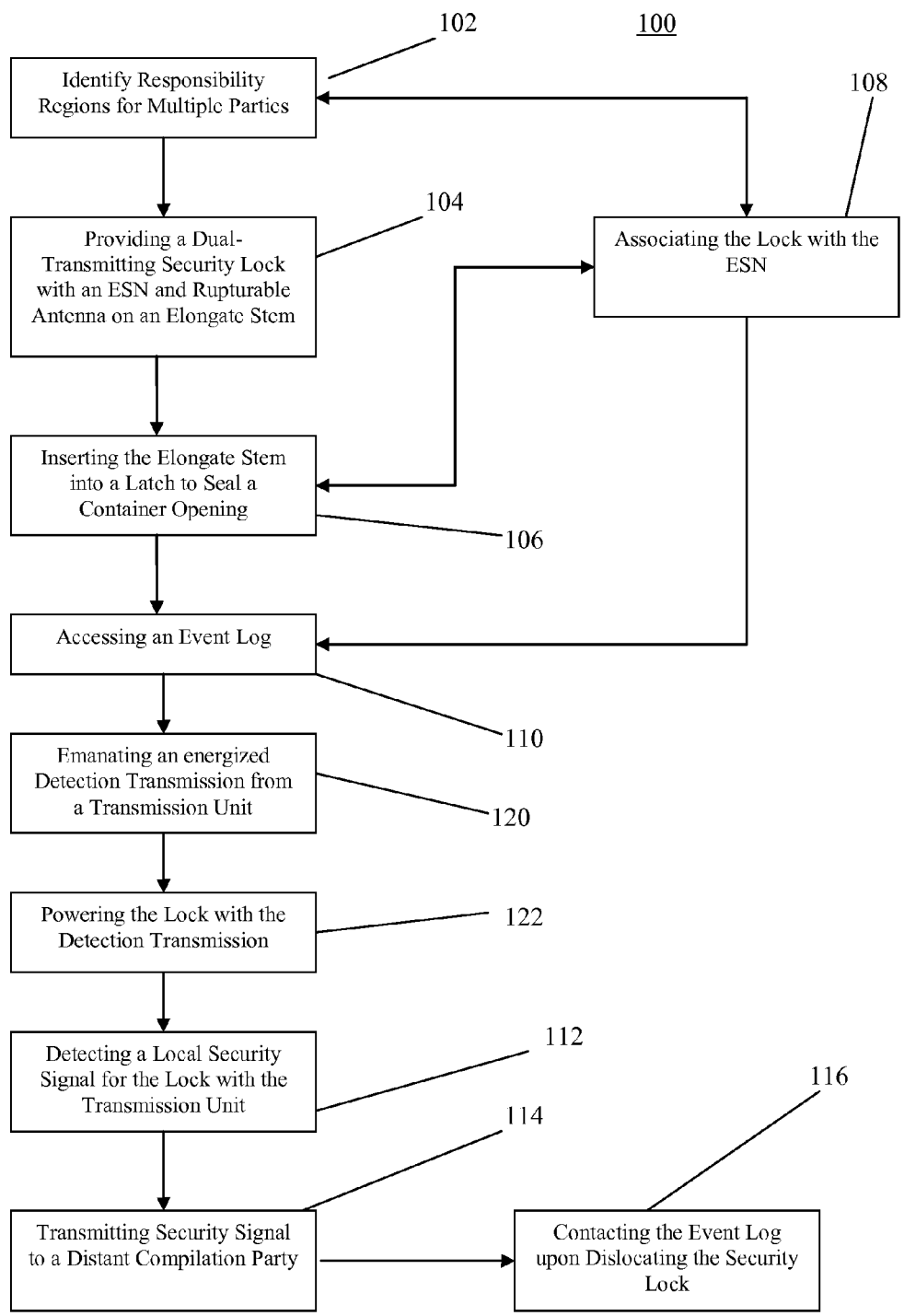
FIG. 9 is a view of the process of the present invention.

All desired security parties of the present invention may directly or indirectly transmit information to a compilation party, whether a reach-through compilation party, conveyance party, regulatory party, or other security party. With reference to FIGS. 7 and 9, after meaningful conveyance the locks 400 on the containers 310 of the present invention may be detected 112 by the transmission units 312, of the present invention. In a preferred embodiment of the process 100 of the present invention, the transmission units 312 emanate 120 an energized detection transmission. The transmission is received by the primary antenna, if structurally intact, and in some embodiments the secondary antenna, if present, and passed to the primary integrated circuit and secondary integrated circuit, respectively. En route to the circuits the transmission powers the integrated circuits or a capacitor, or other energy storage source, adapted to receive power 122 induced from signal transmission. The energy storage source powers the integrated circuit and induces a return signal from the security lock 400 to the transmission unit 312. The return signal includes at least the identifier or its functional equivalent. It is preferred that the detection signal and the return signal are modified for use in a band that permits transmission approximately on the range of a 10 meter local signal. For fixed unit transmission units, it is preferred that the transmission unit signal emanation preferably includes a spread transmission suitable to create an arced wavefront for the purpose of accounting for the variations in security lock positions in transit proximate to the transmission unit. Similarly, it is preferred that security lock signal emanation preferably includes a spread transmission suitable to create an arced wavefront for the purpose of accounting for the variations in relative positions of the security lock with respect to the transmission unit.

The transmission unit 312 then transmits 114 data from the security signal to the distant compilation party. By distant, it is meant that the transmission unit 112 is capable of transmitting a signal beyond sight range or is not restricted by a range necessary to ensure signal power inducement upon the security lock. The transmission from a transmission unit to a compilation party may include any transmission, including direct transmissions. As FIG. 7 shows, the results of the data transmission indicate the security integrity of each security lock. Locks for containers A, B, and D respond and therefore are likely intact; container C, alternatively, evades detection. Lack of response is a prime indicator of lock tempering. A reach-through compilation party or other compilation party may access a compiled event log to determine the last geographic location of a response from the lock of container C to determine the particular responsibility party culpable for any lock tampering.

The preferred transmission includes at least a broadcast of the identifier, shown as the ESN, to the transmission unit. The event log should be accessed 110 and updated upon each read of the data within the security lock. The event log is preferably retained and managed by the compilation party and preferably includes all data gleaned from any read by any security party in connection with the security lock. In other embodiments of the invention where each security party is a compilation party, the security party may retain the data of the event log related to the reads of that particular security party. The accessing 110 may be instantaneous to the reading/writing/ detection of the security lock or delayed for later transmission. By access it meant any operation that reads, deletes, augments, alters, modifies, or otherwise utilizes an operation in connection with data stored in the event log. The preferred event log includes data transmitted contemporaneous to a detection 112 from a transmission unit 312 sequentially acquired from each transmission unit encountered by the security lock during the conveyance of the container. When the security lock is ready for removal, e.g. upon reaching the destination of the container, the event log is preferably contacted 116 to indicate the removal of the security lock proximate in time to the removal of the security lock. Other events may justify removal of the security lock prior to reaching the destination of the container.

Turning to FIG. 10, the present invention allows for replacement 118 of the security lock with another security lock. As it is a feature of the present invention that security locks may not in desired circumstances be reusable, the only means to continue with the heightened security provided by the process in the event of inspection prior to reaching a destination is the use of a replacement lock. For example, a regulatory party seeking to examine the contents of the container may at any time configure the lock in the open position—destroying the primary antenna integrity, remove the lock from the latch, and view the container interior. The regulatory party may then replace the security lock with a replacement security lock and notify a compilation party of the removal and replacement. The notification includes particular reference to the identifier of the lock removed and the identifier of the replacement lock. A compilation party, or other security party, may then electronically link the identifier of the original security lock to that of the replacement security lock to maintain the integrity of the security of the container. Notification of the replacement and linking information may be distributed among the security parties.

Figure 8:
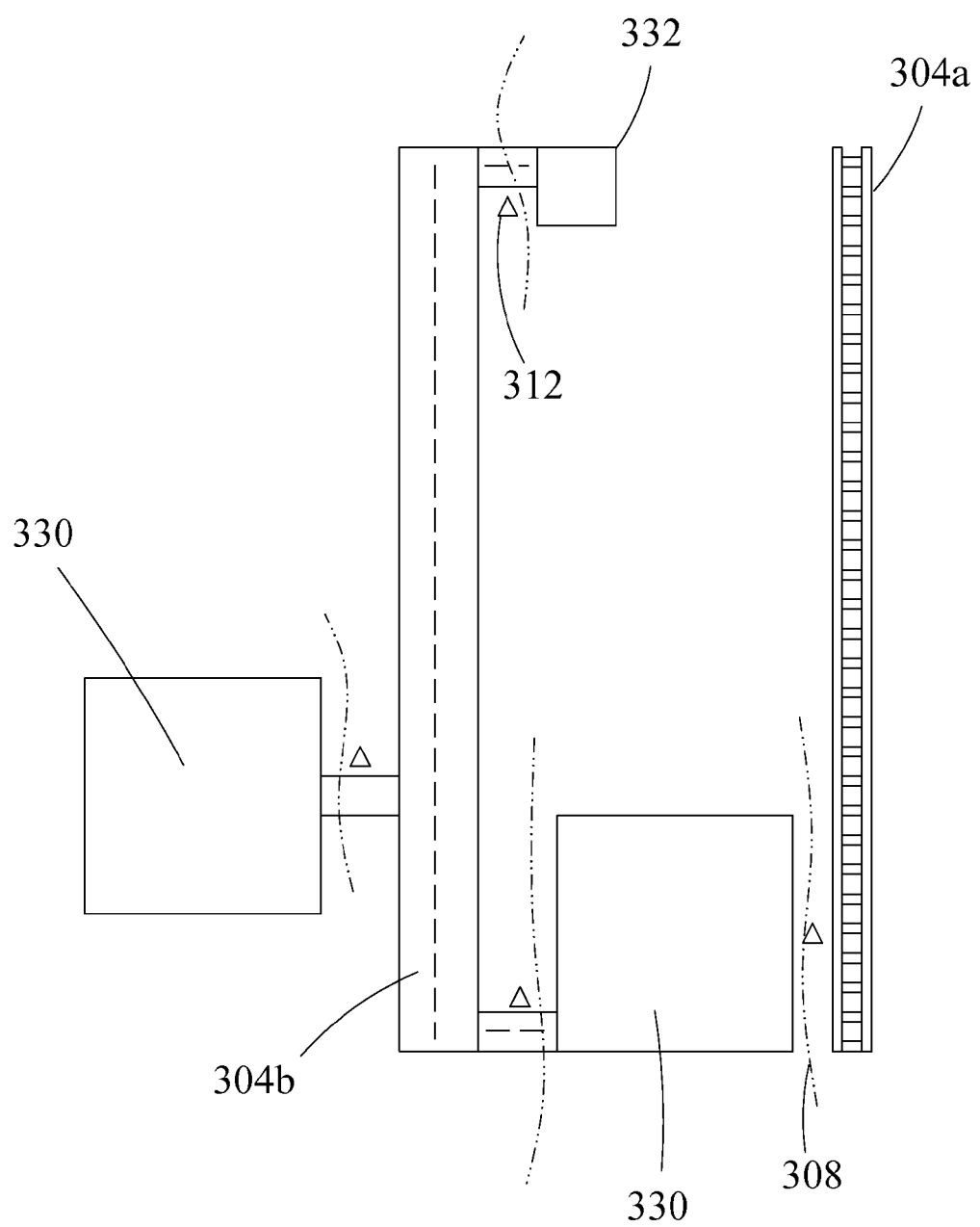
FIG. 8 is a view of the process of the present invention.

Turning now to FIG. 8 a preferred positioning for the fixed transmission units 312 is shown. The fixed transmission units are affixed near the discrete responsibility regions 308 with geographic boundaries. Substantially confined traffic pathways 304 may include railroad tracks 304a and roads 304b. Containers conveyed in commerce may often transition from roads to rail and vice versa. This transition will often include a transition in responsibility as well as a transition in position. A responsibility region may include any geographic area that may be distinguished from another geographic area due to the circumstances related to container control, including the following distinguishing characteristics: a change in ownership of the real property upon which the mode of transport is located, a change in container handling mechanisms, a change in container handling staff, a change in mode of transport, and the like. Although it is envisioned that collaborating conveyance parties may utilize fixed transmission units of the peripheries of their respective boundaries, it may also be the case that a company may wish to use transmission units to segment its internal shipping security into multiple security zones. In the case of collaborating conveyance parties, each company may place a fixed transmission unit at its periphery such that a geographic boundary includes one fixed transmission unit per conveyance party per pathway positioned near a boundary; or alternatively, reliance upon a reach-through compilation party trusted by both, or more, parties may justify placement of a single transmission unit at the boundary of two responsibility regions for the detection of the security locks of the present invention. As FIG. 8 shows, exemplary placement for transmission units, fixed or mobile, includes the segue from rail 304a to freight yard 330, freight yard 330 to road 304b, road 304b to freight yard 330, road 304b to destination 332, etc. Each instance where a change of conveyance circumstances exist may merit the detection, and subsequent security verification/reading/writing, of a security lock on a container.

All data of the present invention is preferably secured via cryptography or other data security mechanism. A preferred means for securing data includes use of public key infrastructure (PKI) techniques. All parties desiring legitimate, secured access to transport data of the present invention may be provided digital certificates. The digital certificates bind the identity of the party to a pair of electronic keys that can be used to encrypt and sign digital information. The digital certificate allows a party to verify its or another party's claim that it has the right to use a given key, helping to prevent a diversion party from using phony keys to impersonate legitimate, security parties. Used in conjunction with encryption, the digital certificates provide a more thorough security solution, assisting to correctly identify all parties involved in the conveyance of a container. Certified parties may include conveyance parties, security parties, compilation parties, and regulatory parties. The digital certificates are preferably issued by the compilation party, or an agent working on its behalf, and may include the issued party's public key, the issued party's name, the expiration date of the public key, the name of the issuing party, the identification number of the digital certificate, the digital signature of the issuing party, or other security information. The format for the digital certificate may comply with any standard existing or later-devised.

Any data transmission transactions may utilize non-repudiated digital signatures. The signature includes mathematical verification that the message originated from the party from whom a transmission is asserted to originate and that the data of the transmission has not been altered either intentionally or accidentally since completion. Furthermore, secure digital signatures cannot be repudiated; the signer of a document cannot later disown it by claiming the signature was forged or otherwise affected by dishonest means. Further data security measures may include time-stamping. A digital time-stamping service issues time-stamps which associate a date and time with electronic data document cryptographically. The digital time-stamp can be used at a later date to prove that data existed or was manipulated at the time stated on its time-stamp.

FIGS. 11-18 depict a buried embodiment of the security lock 400. The buried embodiment preferably includes the primary integrated circuit 406 and the secondary integrated circuit 416 disposed within the reception block 402. The reception block 402 is fabricated of a plastic that encompasses and fully encloses the primary integrated circuit 406, the secondary integrated circuit 416, the primary antenna 104, and the secondary antenna 414. The reception block 402 and the mast 408 preferably consist of a unitary entity that encloses their respective components. The preferred buried lock 400 includes a mast that terminates in a mast base characterized by a fissure recess 460 connected to a mast knob 458. The mast knob 458 is an entity bearing a sidewall dimensioned to sealingly engage an interior wall of a mast cap 420 adapted to slide upon the mast 408. The knob 458 may include a knob recess 450 of recess dimensions less than that of the fissure recess 460 preceding the knob 458. The knob recess 450 is dimensioned to accept a retention ring 452 for placement within the knob recess 450 and within a cap recess 462 positioned upon the interior sidewall of the mast cap 420. The retention ring 452 may be permanently affixed within the cap recess 462 or knob recess 450, or may be a distinct entity capable of time-discriminated positioning in relation to the knob and mast cap. The retention ring includes an elastic material capable of providing radial contortion sufficient to allow the mast cap 420 to slide over the knob 458 and position the knob recess directly over the cap recess. The retention ring 452 in conjunction with a recess, either the knob recess or the cap recess, acts to create with the component bearing that recess an interference fit in relation to the recess of the mating component, either the knob or mast cap.

The mast cap 420 of the buried device for positioning upon the knob 458 preferably includes longitudinal dimensions sufficient to extend well beyond the terminus of the knob. Such dimensions minimize the ability of objects to be inserted within the mast cap 420 to physically manipulate the retention ring 452. Embodiments of the present invention may further include a mast cap 420 with an endwall dimensioned to eliminate access to the retention ring 452. The preferred dimensions of the mast cap 420 are further such that the mast cap 420 covers the fissure recess 460 to prevent manipulation of the gulf between the mast proper and the knob terminus of the mast. For example, the body of mast cap 420, when positioned, acts to prevent an unauthorized user from bolstering the connection between the mast knob and the mast proper with an adhesive or other construction component capable of increasing the force required to rend the knob from the mast. The buried lock 400 preferably includes a substantially solid mast and reception block, i.e. the mast and reception block are solid with the exception of the space occupied by components such as the antennae and chipset.

Figure 14:
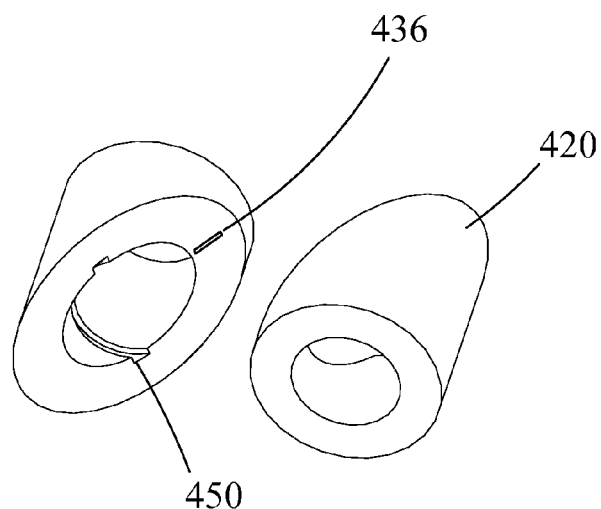
FIG. 14 is a cross-sectional view of an embodiment of the mast cap.
Figure 15:
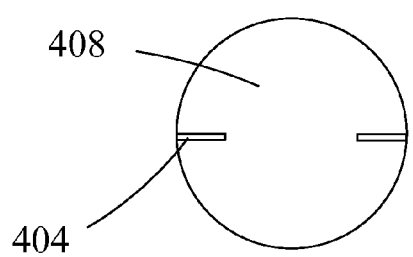
FIG. 15 is a cross-sectional view of the mast.

Upon application of sufficient force, the knob 458 may be removed from the mast 408, taking the mast cap 420 with the knob 458 in the process. The fissure recess 450 may be adjusted in dimensions to selectively alter the force necessary to create a break in the mast 408. As FIG. 15 shows, the mast 408 of the buried device includes the primary antenna 404 within the body of the mast 408. The primary antenna 404 winds to the terminus of the mast 408 such that it converges within the knob and is removed with the knob upon a break proximate to the fissure recess. As FIG. 14 shows, the buried device preferably includes a verification integrated circuit 436 within the mast cap 420. The verification integrated circuit 450 includes a verification antenna (not shown) capable of short range transmissions. The verification integrated circuit includes information and data sufficient to verify that the primary integrated circuit, secondary integrated circuit—if present, and that verification integrated circuit are valid components of a single verified system.

Figure 16:
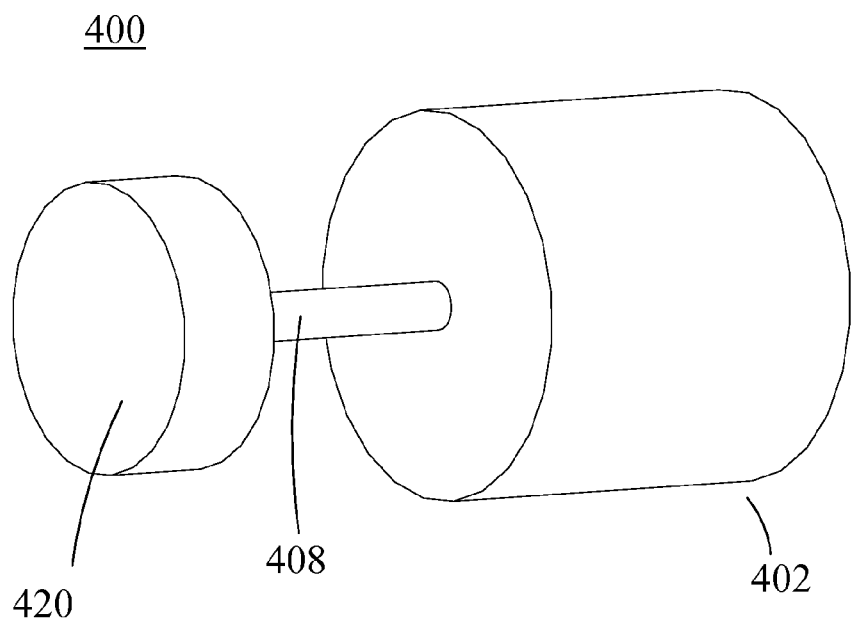
FIG. 16 is a perspective view of the device of the present invention.
Figure 17:
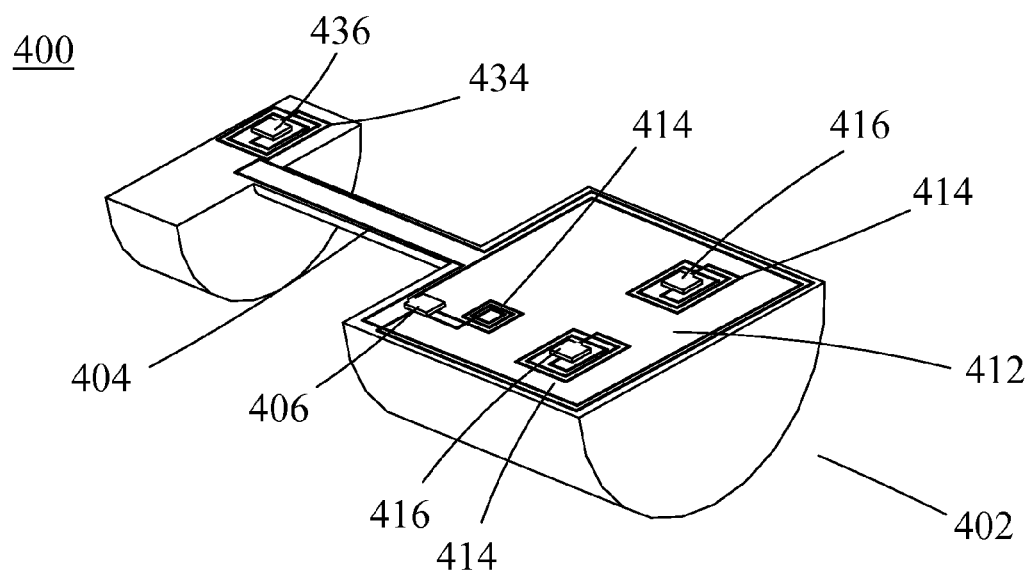
FIG. 17 is a cross-sectional view of the device of the present invention.
Figure 18:
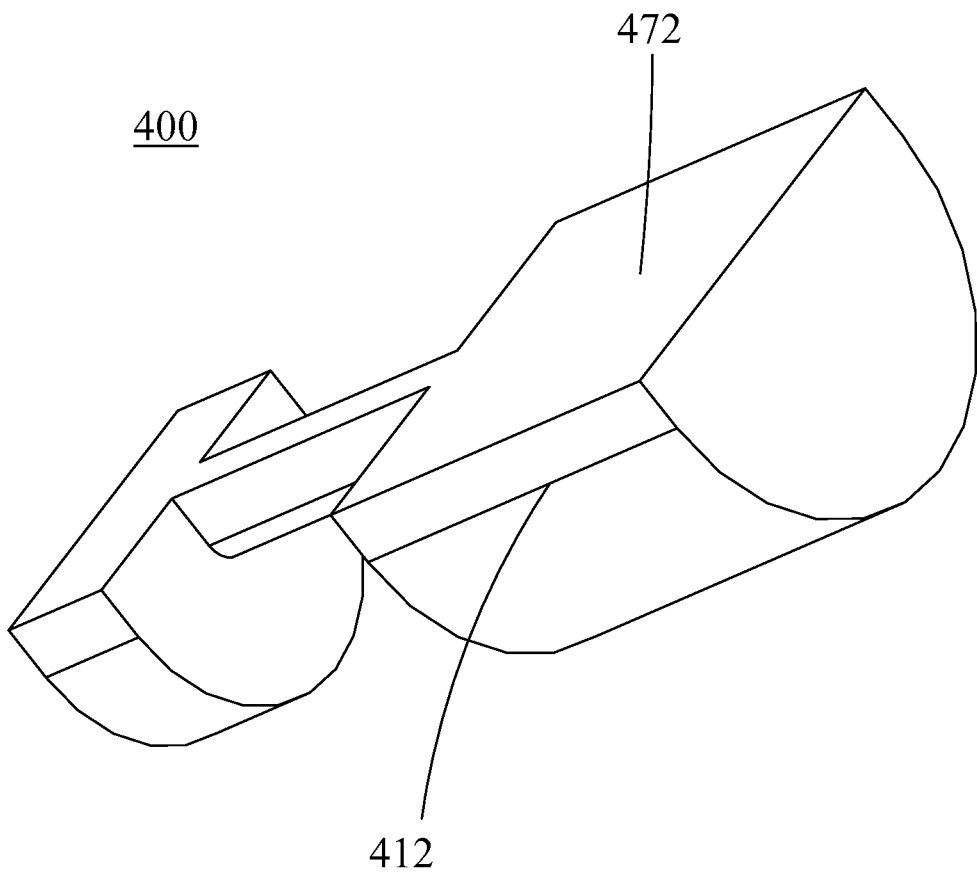
FIG. 18 is a perspective view of the device of the present invention.

With specific reference to FIGS. 16-17, the security lock 400 may include non-substantially-planar dimensions. The reception surface 412 may be enclosed within the reception block 402 and feature multiple primary integrated circuits 406, multiple secondary integrated circuits 416, multiple secondary antennae 414, and multiple primary antennae 404. It is preferred that all antennae and integrated circuits of the reception block 402 are located on a single reception surface occupying a planar cross-section of the security lock 400. Location on a single reception surface 412 is unnecessary, and in embodiments featuring multiple reception surfaces, it is preferred that the reception surfaces are parallel planar to each other reception surface. The exterior surface(s) of the security lock may include rounded dimensions suitable to allow the security lock to roll within a latch, or include dimensions adapted to prevent severance of components other than the pre-intended fracture zones proximate to the mast 408. As. FIG. 18 shows, the backwall 472 of the security lock 400 may include a planar character, in contrast to its distal surface, to prevent rolling yet continue to allow for increased girth to deter cutting of the security lock.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A shipping container security process for remotely monitoring shipping containers, said process comprising:

identifying for at least two conveyance parties responsibility regions with at least one nested, substantially confined, pre-defined traffic pathway and discrete geographic boundaries;

providing a lock with a unique identifier, said lock comprising: a primary radio frequency identification integrated circuit, containing said identifier, with a primary antenna, disposed along an elongate mast, adapted to rupture upon dislocation of said lock from said closed position; and a secondary radio frequency identification integrated circuit in signaled communication with a secondary antenna remotely positioned from said mast;

inserting said elongate mast of said lock, having an open position and a closed position of altered lock dimensions relative to said open position, to a container latch, positionally proximate to a container opening to seal said container with said closed position of said lock;

electronically associating said lock with said identifier;

accessing an event log temporally proximate to actuating said lock into said closed position;

detecting a local security signal with a transmission unit, positionally proximate to both said responsibility region boundary and said traffic pathway, from said primary radio frequency identification integrated circuit through said primary antenna;

transmitting with said transmission unit said security signal to a distant compilation party;

contacting said event log temporally proximate to dislocating said lock from said closed position;

replacing said lock with a replacement lock with a unique replacement lock identifier, said replacement lock comprising: a replacement lock primary radio frequency identification integrated circuit, containing said replacement lock identifier, with a replacement lock primary antenna, disposed along a replacement lock elongate mast, adapted to rupture upon dislocation of said replacement lock from said closed position; and a replacement lock secondary radio frequency identification integrated circuit with a replacement lock secondary antenna substantially distant from said replacement lock mast;

inserting said elongate mast of said replacement lock, having said open position and said closed position of altered lock dimensions relative to said open position, into said container latch positionally proximate to said container opening to seal said container with said closed position of said replacement lock;

associating said secondary integrated circuit with said identifier;

accessing said event log temporally proximate to actuating said replacement lock into said closed position;

informationally linking said lock with said replacement lock in said event log;

detecting said security signal with said transmission unit, positionally proximate to both said responsibility region boundary and said traffic pathway, from said replacement lock primary radio frequency identification integrated circuit through said replacement lock primary antenna;

transmitting said security signal to a compilation party distinct from said conveyance parties; and contacting said event log temporally proximate to dislocating said replacement lock from said closed position.

2. The process of claim 1 wherein said transmitting step includes transmitting said security signal to said distant compilation party distinct from said conveyance parties.

3. The process of claim 2 further comprising marking said lock with a physical representation of said identifier.

4. The process of claim 3 further comprising writing conveyance data to said primary integrated circuit chip.

5. The process of claim 4 wherein said wherein said writing conveyance data to said primary integrated circuit chip step includes writing conveyance data to said primary integrated circuit chip through said primary transmitter.

6. The process of claim 3 further comprising writing conveyance data to said secondary integrated circuit chip.

7. The process of claim 6 wherein said writing conveyance data to said secondary integrated circuit chip step includes writing conveyance data to said secondary integrated circuit chip through said primary transmitter.

8. The process of claim 3 further comprising the step of notifying said compilation party of conveyance termination.

9. The process of claim 1 further comprising updating said event log in response to a positional transition of said lock from a first responsibility regions to a second responsibility region distinct from said first responsibility region.

10. A shipping container security process for remotely monitoring shipping containers, said process comprising:

identifying for at least two conveyance parties responsibility regions with at least one nested, substantially confined, pre-defined traffic pathway and discrete geographic boundaries;

providing a lock with a unique identifier, said lock comprising: a physical representation of said identifier; a primary radio frequency identification integrated circuit, containing said identifier, with a primary antenna, disposed along an elongate mast, adapted to rupture upon dislocation of said lock from said closed position; and a secondary radio frequency identification integrated circuit with a secondary antenna remotely positioned from said mast;

inserting said elongate mast of said lock, having an open position and a closed position of altered lock dimensions relative to said open position, into a container latch, positionally proximate to a container opening to seal said container with said closed position of said lock;

accessing an event log temporally proximate to actuating said lock into said closed position;

associating said secondary integrated circuit with said identifier;

emanating a substantially energized detection transmission from a transmission unit, positionally proximate to both said responsibility region boundary and said traffic pathway, adapted to power said primary radio frequency identification integrated circuit;

powering said primary radio frequency identification integrated circuit through said primary antenna with said detection transmission;

detecting a security signal with said transmission unit from said primary radio frequency identification integrated circuit through said primary antenna;

transmitting with said transmission unit said security signal to a compilation party distinct from said conveyance parties;

replacing said lock with a replacement lock with a unique replacement lock identifier, said replacement lock comprising: a replacement lock primary radio frequency identification integrated circuit, containing said replacement lock identifier, with a replacement lock primary antenna, disposed along a replacement lock elongate mast, adapted to rupture upon dislocation of said replacement lock from said closed position; and a replacement lock secondary radio frequency identification integrated circuit with a replacement lock secondary antenna substantially distant from said replacement lock mast;

inserting said elongate mast of said replacement lock, having said open position and said closed position of altered lock dimensions relative to said open position, into said container latch positionally proximate to said container opening to seal said container with said closed position of said replacement lock;

associating said secondary integrated circuit with said identifier;

accessing said event log temporally proximate to actuating said replacement lock into said closed position;

informationally linking said lock with said replacement lock in said event log;

detecting said security signal with said transmission unit, positionally proximate to both said responsibility region boundary and said traffic pathway, from said replacement lock primary radio frequency identification integrated circuit through said replacement lock primary antenna;

transmitting said security signal to a compilation party distinct from said conveyance parties; and contacting said event log temporally proximate to dislocating said replacement lock from said closed position.

11. The process of claim 10 further comprising marking said lock with a physical representation of said identifier.

12. The process of claim 11 further comprising writing conveyance data to said primary integrated circuit chip.

13. The process of claim 12 wherein said wherein said writing conveyance data to said primary integrated circuit chip step includes writing conveyance data to said primary integrated circuit chip through said primary transmitter.

14. The process of claim 11 further comprising writing conveyance data to said secondary integrated circuit chip.

15. The process of claim 14 wherein said writing conveyance data to said secondary integrated circuit chip step includes writing conveyance data to said secondary integrated circuit chip through said primary transmitter.

16. The process of claim 11 further comprising the step of notifying said compilation party of conveyance termination.

17. A shipping container security process for remotely monitoring shipping containers, said process comprising:

identifying for at least two conveyance parties responsibility regions with at least one nested, substantially confined, pre-defined traffic pathway and discrete geographic boundaries;

providing a lock with a unique identifier, said lock comprising: a primary radio frequency identification integrated circuit, containing said identifier, with a primary antenna, disposed along an elongate mast, adapted to rupture upon dislocation of said lock from said closed position;

inserting said elongate mast of said lock, having an open position and a closed position of altered lock dimensions relative to said open position, into a container latch, positionally proximate to a container opening to seal said container with said closed position of said lock;

transmitting, temporally proximate to said inserting step, said identifier with a mobile transmission unit to a compilation party event log;

emanating a substantially energized detection transmission from a transmission unit, positionally proximate to both said responsibility region boundary and said traffic pathway, adapted to power said primary radio frequency identification integrated circuit;

powering said primary radio frequency identification integrated circuit through said primary antenna with said detection transmission;

detecting a security signal with said transmission unit from said primary radio frequency identification integrated circuit through said primary antenna;

distantly transmitting with said transmission unit said security signal to a compilation party; and updating said event log in response to a positional transition of said lock from at least one said responsibility regions to at least one of said responsibility regions;

replacing said lock with a replacement lock with a unique replacement lock identifier, said replacement lock comprising: a replacement lock primary radio frequency identification integrated circuit, containing said replacement lock identifier, with a replacement lock primary antenna, disposed along a replacement lock elongate mast, adapted to rupture upon dislocation of said replacement lock from said closed position; and a replacement lock secondary radio frequency identification integrated circuit with a replacement lock secondary antenna substantially distant from said replacement lock mast;

inserting said elongate mast of said replacement lock, having said open position and said closed position of altered lock dimensions relative to said open position, into said container latch positionally proximate to said container opening to seal said container with said closed position of said replacement lock;

associating said secondary integrated circuit with said identifier;

accessing said event log temporally proximate to actuating said replacement lock into said closed position;

informationally linking said lock with said replacement lock in said event log;

detecting said security signal with said transmission unit, positionally proximate to both said responsibility region boundary and said traffic pathway, from said replacement lock primary radio frequency identification integrated circuit through said replacement lock primary antenna;

transmitting said security signal to a compilation party distinct from said conveyance parties; and contacting said event log temporally proximate to dislocating said replacement lock from said closed position.

18. A shipping container security process for remotely monitoring shipping containers, said process comprising:

identifying for at least two conveyance parties responsibility regions with at least one nested pre-defined traffic pathway and discrete geographic boundaries;

providing a lock with a unique electronic identifier, said lock comprising: a primary radio frequency identification integrated circuit in sole signaled communication with a primary antenna, disposed along an elongate mast, adapted to rupture upon dislocation of said lock from said closed position; and a secondary radio frequency identification integrated circuit in sole signaled communication with a secondary antenna remotely positioned from said mast, wherein at least one of said primary integrated circuit and said secondary integrated circuit store said electronic identifier;

inserting said elongate mast of said lock, having an open position and a closed position of altered lock dimensions relative to said open position, to a container latch, positionally proximate to a container opening to seal said container with said closed position of said lock;

electronically associating said lock with said identifier;

accessing an event log temporally proximate to actuating said lock into said closed position;

detecting a local security signal with a transmission unit, positionally proximate to both said responsibility region boundary and said traffic pathway, from said primary radio frequency identification integrated circuit through said primary antenna;

transmitting with said transmission unit said security signal to a distant compilation party; and contacting said event log temporally proximate to dislocating said lock from said closed position;

replacing said lock with a replacement lock with a unique replacement lock identifier, said replacement lock comprising: a replacement lock primary radio frequency identification integrated circuit, containing said replacement lock identifier, with a replacement lock primary antenna, disposed along a replacement lock elongate mast, adapted to rupture upon dislocation of said replacement lock from said closed position; and a replacement lock secondary radio frequency identification integrated circuit with a replacement lock secondary antenna substantially distant from said replacement lock mast;

inserting said elongate mast of said replacement lock, having said open position and said closed position of altered lock dimensions relative to said open position, into said container latch positionally proximate to said container opening to seal said container with said closed position of said replacement lock;

associating said secondary integrated circuit with said identifier;

accessing said event log temporally proximate to actuating said replacement lock into said closed position;

informationally linking said lock with said replacement lock in said event log;

detecting said security signal with said transmission unit, positionally proximate to both said responsibility region boundary and said traffic pathway, from said replacement lock primary radio frequency identification integrated circuit through said replacement lock primary antenna;

transmitting said security signal to a compilation party distinct from said conveyance parties; and contacting said event log temporally proximate to dislocating said replacement lock from said closed position.

* * * * *